United States Patent
Chong et al.

(10) Patent No.: US 9,609,563 B2
(45) Date of Patent: Mar. 28, 2017

(54) APPARATUS AND METHOD FOR RESERVED TRANSMISSION OF NON-REAL-TIME CONTENT IN HETEROGENEOUS NETWORK ENVIRONMENT

(71) Applicant: Korea Advanced Institute Of Science and Technology, Daejeon (KR)

(72) Inventors: Song Chong, Daejeon (KR); Yung Yi, Daejeon (KR); Kyoung-soo Park, Daejeon (KR); Joo-hyun Lee, Seoul (KR)

(73) Assignee: Korea Advanced Institute Of Science and Technology, Daejeon (KR)

( * ) Notice: Subject to any disclaimer, the term of this patent is extended or adjusted under 35 U.S.C. 154(b) by 44 days.

(21) Appl. No.: 14/387,403

(22) PCT Filed: Dec. 5, 2012

(86) PCT No.: PCT/KR2012/010475
§ 371 (c)(1),
(2) Date: Feb. 10, 2015

(87) PCT Pub. No.: WO2013/141463
PCT Pub. Date: Sep. 26, 2013

(65) Prior Publication Data
US 2015/0181489 A1    Jun. 25, 2015

(30) Foreign Application Priority Data
Mar. 23, 2012 (KR) .................. 10-2012-0029619

(51) Int. Cl.
H04W 36/00 (2009.01)
H04W 36/18 (2009.01)
(Continued)

(52) U.S. Cl.
CPC .......... *H04W 36/18* (2013.01); *H04W 24/02* (2013.01); *H04W 36/0022* (2013.01);
(Continued)

(58) Field of Classification Search
None
See application file for complete search history.

(56) References Cited

U.S. PATENT DOCUMENTS

| | | | |
|---|---|---|---|
| 2002/0016162 A1* | 2/2002 | Yoshihara | H04L 67/325 455/412.1 |
| 2004/0095916 A1* | 5/2004 | Maki | H04L 67/30 370/338 |

(Continued)

FOREIGN PATENT DOCUMENTS

| | | |
|---|---|---|
| KR | 10-0703358 B1 | 4/2007 |
| KR | 10-0706399 B1 | 4/2007 |

(Continued)

OTHER PUBLICATIONS

International Search Report of PCT/KR2012/010475 dated Feb. 28, 2013 [PCT/ISA/210].

(Continued)

*Primary Examiner* — Chi H Pham
*Assistant Examiner* — Soon-Dong D Hyun
(74) *Attorney, Agent, or Firm* — Sughrue Mion, PLLC

(57) ABSTRACT

An apparatus and a method for reserved transmission of non-real-time content in a heterogeneous network environment are disclosed. According to the present disclosure, a method for performing reserved transmission of non-real-time content in a heterogeneous network environment comprises receiving a transmission reservation option from either a mobile terminal user or a server, collecting information on networks accessible by the mobile terminal and data transmission rate on a regular basis, performing sched-
(Continued)

uling of whether to transmit data over a currently accessible network, based on the received transmission reservation option and the collected information on the accessible networks and the data transmission rate, and repeating data transmission according to the scheduling until transmission of the content is completed.

24 Claims, 7 Drawing Sheets

(51) Int. Cl.
*H04W 72/12* (2009.01)
*H04W 24/02* (2009.01)
H04W 28/26 (2009.01)
H04W 28/06 (2009.01)

(52) U.S. Cl.
CPC ........ *H04W 72/1278* (2013.01); *H04W 28/06* (2013.01); *H04W 28/26* (2013.01)

(56) References Cited

U.S. PATENT DOCUMENTS

| | | | |
|---|---|---|---|
| 2007/0162538 A1* | 7/2007 | Kim | G06F 8/61 709/200 |
| 2008/0117852 A1* | 5/2008 | Bennett | H04L 12/189 370/312 |
| 2013/0016667 A1* | 1/2013 | Blomqvist | H04M 15/8027 370/329 |

FOREIGN PATENT DOCUMENTS

| | | |
|---|---|---|
| KR | 10-0766601 B1 | 10/2007 |
| KR | 10-2010-0071502 A | 6/2010 |
| KR | 10-2012-0012581 A | 2/2012 |

OTHER PUBLICATIONS

Written Opinion of PCT/KR2012/010475 dated Feb. 28, 2013 [PCT/ISA/237].

* cited by examiner

APPARATUS AND METHOD FOR RESERVED TRANSMISSION OF NON-REAL-TIME CONTENT IN HETEROGENEOUS NETWORK ENVIRONMENT

TECHNICAL FIELD

The present disclosure in some embodiments relates to a method for reserved transmission of non-real-time content in a heterogeneous network environment, and to non-transitory computer readable media, servers and mobile terminals for the same. More particularly, the present disclosure as applied to a mobile terminal capable of connecting itself to multiple heterogeneous networks, relates to a method and apparatus for setting transmission reservation options for content according to requirements for content and mobility characteristics of mobile terminals and to a method and apparatus for providing efficient use of wireless networks depending on transmission reservation options for content.

BACKGROUND

As widespread use of high-performance mobile terminals such as smartphones and tablet PCs adds to mobile data traffic congestion, cellular networks more seriously suffer from capacity shortages entailing a network load problem, which is predicted to develop into still heavier network load.

Radio communication technologies such as code division multiple access (CDMA) and global system for mobile communications (GSM) can maintain seamless communication even while a mobile terminal is in motion with the use of a cell-based switching known as handoff. In contrast, Wi-Fi does not guarantee the cell-based switching but only communication in a stationary state at a specific place, and the communication speed geometrically decreases as the mobile terminal moves faster. For this reason, if the mobile terminal leaves a Wi-Fi zone while uploading or downloading large-capacity content in real time in a Wi-Fi network, communication link is disconnected thereby fail to transmit data. Therefore, when transmitting a large amount of content with a mobile terminal in motion, there is a need to make an active use of the Wi-Fi or such networks with relatively high data rate and lower cost together with cellular networks without a data transmission failure in order to increase the overall radio network efficiency.

To this end, Korean patent application number KR10-2009-0120495, entitled "Transmission Delay System of Data in Cellular Networks," discloses an enhancement of the overall cellular network transmission efficiency by allowing a transmission delay for non-real-time data.

Mobile terminals may inter-work with different types of access networks due to the mobility of the mobile terminal users. It is well known that mobile terminal users show a periodic tendency on a daily basis or on a weekly basis towards, for example, traveling a predetermined route (commuting etc.) at a specific time slot or staying at a specific place (an office, school, home, etc.) during the day or at night. Accordingly, it is necessary to improve the overall radio network efficiency by e.g., distributing transmission data to all radio networks by using a data transmission rate or location information of an access network which is accessible by the user terminal while the user travels or stays at a place.

DISCLOSURE

Technical Problem

Therefore, the present disclosure has been made to perform transmission of non-real-time content by allowing a mobile terminal user or a server or its administrator to set transmission reservation options based on a reserved transmission regime.

In some aspects, the present disclosure seeks to enable a mobile terminal user or a server or its administrator to set transmission reservation options by taking account of a transmission completion time, a maximum data transmission charge or cost, data usage per preferred network and a transmission time slot.

In another aspect, the present disclosure seeks to distribute data to transmit to all wireless networks based on the setting of the transmission reservation options and by taking account of network-specific data transmission rate, network-specific data transmission cost, network-specific coverage, transmission energy, content volume, etc.

In yet another aspect, the present disclosure seeks to predict accessible networks and data transmission rate based on history information of a mobile terminal at a certain time and location and thereby distribute data to all wireless networks.

In yet another aspect, the present disclosure seeks to introduce terminal-to-terminal data transmission in uploading or downloading content and thereby further decrease the frequency of using heterogeneous networks for content transmission when data transmission is available between different mobile terminals over networks other than a cellular network.

SUMMARY

In accordance with some embodiments of the present disclosure, a method for performing reserved transmission of mobile content in a heterogeneous network environment comprises receiving a transmission reservation option from either a mobile terminal user or a server, collecting information on networks accessible by the mobile terminal and data transmission rate on a regular basis, performing a scheduling of whether to transmit data over a currently accessible network, based on the received reservation option and the collected information on the accessible networks and the data transmission rate, and repeating data transmission according to the scheduling until transmission of the content is completed.

In accordance with some embodiments of the present disclosure, a method for performing reserved transmission of mobile content in a heterogeneous network environment comprises receiving a transmission reservation option from either a mobile terminal user or a server, collecting information on networks accessible by the mobile terminal and data transmission rate at a regular interval, estimating information on accessible networks and data transmission rate according to a travel route of the mobile terminal from history information of the mobile terminal, performing scheduling of whether to transmit data over a currently accessible network, based on the received transmission reservation option, the collected information on the accessible networks and the data transmission rate and the estimation information on the accessible networks and the data transmission rate, and repeating data transmission according to the scheduling until transmission of the content is completed.

The transmission reservation option includes at least one of a transmission completion time, a data transmission cost, data usage per preferred network and a transmission time slot.

The transmission reservation option is one transmission completion time selected by the mobile terminal user from among a plurality of transmission completion times provided by the server.

The performing of the scheduling comprises performing scheduling for minimizing a prescribed function value having at least one of transmission energy, a transmission cost and a transmission completion time as a parameter.

The prescribed function value is expressed by $$\min_{\pi \in \Pi} f(p(\pi), e(\pi), u(\pi))$$

where $\pi$ is an arbitrary scheduling vector, $\Pi$ is a set of scheduling vectors configured to transmit requested content according to setting of the reservation transmission option, $p(\pi)$ is a transmission cost of the scheduling vector $\pi$, $e(\pi)$ is transmission energy of the scheduling vector $\pi$, $u(\pi)$ is a transmission completion time of the scheduling vector $\pi$ and $f(p(\pi),e(\pi),u(\pi))$ is an objective (utility) function for the transmission cost, the transmission energy and the transmission completion time.

The collecting of the information comprises a subsequent step of storing, after processing and compression, the information on the accessible networks and the data transmission rate according to the travel route of the mobile terminal.

The receiving of the transmission reservation option comprises subsequent steps of: calculating a maximum transmission delay of quantity of remaining data for transmission, based on the received transmission reservation option; determining whether transmission of all the content has been completed when the maximum transmission delay has elapsed; and transmitting the remaining data to a first preferred network from the mobile terminal when transmission of all the content has not been completed.

The first preferred network is a network having a highest data transmission rate and a network having a widest base station coverage among networks accessible by the mobile terminal when the maximum transmission time has elapsed.

The first preferred network is a cellular network.

In accordance with some embodiments of the present disclosure, a data server for performing reserved transmission of non-real-time content in a heterogeneous network environment involving multiple heterogeneous communication networks serving data communications to a mobile terminal, comprises an input/output unit, an operation unit and a data storage unit. The input/output unit is configured to receive a transmission reservation option from either a mobile terminal user or a server, receive information on accessible networks and data transmission rate on a regular basis from the mobile terminal and transmit the content. The operation unit is configured to perform a scheduling of whether to transmit data over a currently accessible network, based on the received transmission reservation option and the received information on the accessible networks and the data transmission rate. And the data storage unit is configured to receive data from the input/output unit and store the data, or transmit the stored data to the input/output unit.

In accordance with some embodiments of the present disclosure, a data server for performing reserved transmission of non-real-time content in a heterogeneous network environment involving multiple heterogeneous communication networks serving data communications to a mobile terminal, comprises an input/output unit, an operation unit and a data storage unit. The input/output unit is configured to receive a transmission reservation option from either a mobile terminal user or a server, receive history information of the mobile terminal and information on accessible networks and data transmission rate on a regular basis from the mobile terminal and transmit the content. The operation unit is configured to perform a scheduling of whether to transmit data over a currently accessible network, based on the received transmission reservation option, the received history information of the mobile terminal and the received information on the accessible networks and the data transmission rate. And the data storage unit is configured to receive data from the input/output unit and store the data, or transmit the stored data to the input/output unit.

In accordance with some embodiments of the present disclosure, a mobile terminal for performing reserved transmission of non-real-time content in a heterogeneous network environment involving multiple heterogeneous networks serving data communications to the mobile terminal, comprises a transmission reservation option setting module, a network search module, an operation module, an input/output module and a data storage module. The transmission reservation option setting module is configured to receive a transmission reservation option from either a mobile terminal user or a server. The network search module is configured to collect information on networks accessible by the mobile terminal and data transmission rate at on a regular basis. The operation module is configured to repeat scheduling of whether to transmit data over a currently accessible network until transmission of the content is completed, based on the transmission reservation option received by the transmission reservation option setting module and the information on the accessible networks and the data transmission rate collected by the network search module. The input/output module is configured to transmit data according to the scheduling of the operation module. And the data storage module is configured to receive data from the input/output module and store the data, or transmit the stored data to the input/output module.

In accordance with some embodiments of the present disclosure, a mobile terminal for performing reserved transmission of non-real-time content in a heterogeneous network environment involving multiple heterogeneous networks serving data communications to the mobile terminal, comprises: a transmission reservation option setting module, a network search module, an operation module, an input/output module and a data storage module. The transmission reservation option setting module is configured to receive a transmission reservation option from either a mobile terminal user or a server. The network search module is configured to collect information on accessible networks and data transmission rate according to a travel route of the mobile terminal on a regular basis. The operation module is configured to repeat scheduling of whether to transmit data over a currently accessible network until transmission of the content is completed, based on the transmission reservation option received by the transmission reservation option setting module, the information on the accessible networks and the data transmission rate collected by the network search module and history information of the mobile terminal. The input/output module is configured to transmit data according to the scheduling of the operation module. And the data storage module is configured to receive data from the input/output module and store the data, or transmit the stored data to the input/output module.

Advantageous Effects

In a method for reserved transmission of content in a heterogeneous network environment according to the present disclosure as described above, a mobile terminal user or a server or its administrator is allowed to set transmission reservation options based on a reserved transmission scheme, thereby uploading or downloading content by selectively using heterogeneous networks by taking account of a transmission completion time, transmission cost, transmission rate, base station coverage, etc.

In addition, the present disclosure improves the convenience of a mobile terminal user by selecting various factors such as a transmission completion time, data transmission cost, data usage per preferred network, transmission time slot, etc. as transmission reservation options.

In addition, the present disclosure helps to minimize the use of a cellular network by involving various heterogeneous networks, such as the cellular network, a Wi-Fi network, etc., for data transmission within the allowed transmission completion time.

In addition, the overall radio network transmission efficiency is improved by predicting network connection based on moving patterns of a mobile terminal and then reflecting information on network connection in data distribution to all wireless networks.

In addition, the frequency of utilizing heterogeneous networks for content transmission can be additionally reduced by allowing mobile terminals to exchange non-real-time content or allowing another mobile terminal to transmit content over other networks than a cellular network.

DETAILED DESCRIPTION

Hereinafter, a method for reserved transmission of content in a heterogeneous network environment, and non-transitory computer readable media, servers and mobile terminals for the same according to at least one embodiment of the present disclosure will be described.

Throughout this specification, some parts described as including certain components are meant to include, rather than excluding, other components unless specified otherwise. In addition, the terms " . . . unit" and " . . . module" disclosed herein are used to indicate a unit for processing at least one function or operation which may be realized by hardware, software, or a combination thereof. The term "transmission of content or data" or phrase "content or data is transmitted" disclosed herein includes by definition content or data uploading or downloading. Server or administrator disclosed herein may be a content service provider or a communication network operator. The term "heterogeneous network environment" disclosed herein refers to a network environment in which a plurality of heterogeneous communication networks such as a cellular network and a Wi-Fi network coexist.

A mobile terminal according to the present disclosure refers to a portable terminal carried by a user and includes a delay-tolerant networking feature for temporarily caching content that can be transmitted in non-real-time for a predetermined time among data to transmit under request.

A mobile terminal provides a voice call service, a video call service, a short message service (SMS), a multimedia messaging service (MMS), a long message service (LMS), a large-scale multimedia messaging service (LMMS), a multimedia content transmission service, etc. The mobile terminal comprises a function of providing a predetermined transmission delay to non-time-critical SMS, MMS, LMS, MMS and LMMS other than the real-time voice and video transmission services.

Figure 1:
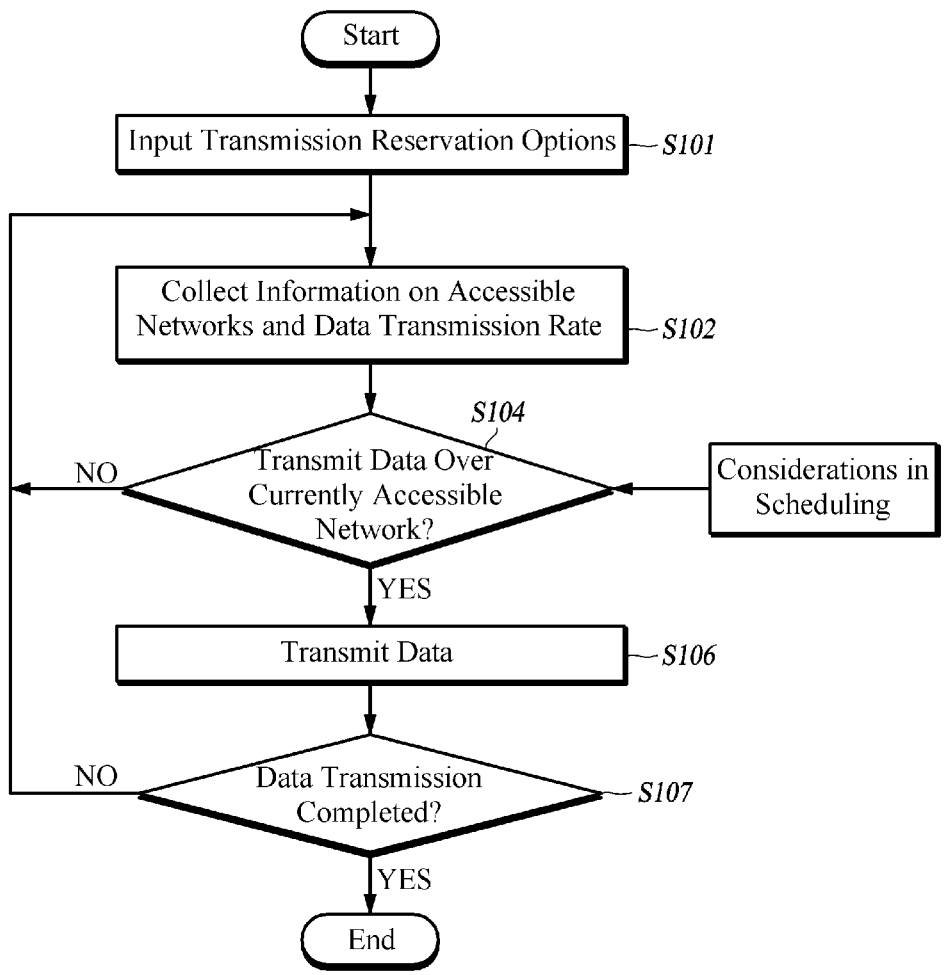
FIG. 1 is a flowchart of a method for reserved transmission of non-real-time content in a heterogeneous network environment according to at least one embodiment.

FIG. 1 is a flowchart of a method for reserved transmission of non-real-time content in a heterogeneous network environment according to at least one embodiment of the present disclosure. The method for reserved transmission of content includes the steps of receiving transmission reservation options (S101), collecting information on accessible networks and a data transmission rate (S102), determining whether to transmit data over a currently accessible network (S104), transmitting the data (S106) and determining whether data transmission has been completed (S107).

At Step S101, when a mobile terminal user wishes to make a reservation for a content transmission, the terminal receives transmission reservation options as set by a mobile terminal user or a server/administrator.

Figure 2:
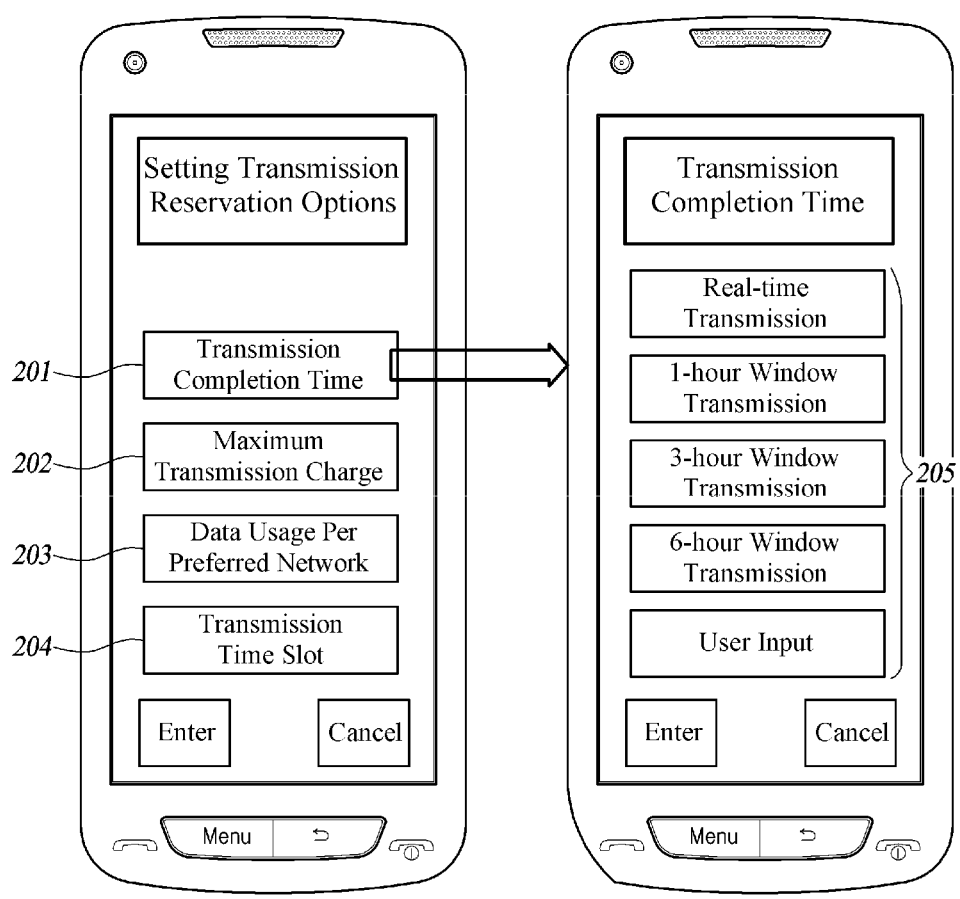
FIG. 2 is a diagram of an example of setting transmission reservation options according to at least one embodiment.

Reference is made to FIG. 2 illustrating an example of setting transmission reservation options according to at least one embodiment of the present disclosure. As illustrated in FIG. 2, the transmission reservation options may be set with respect to various factors such as a transmission completion time 201, a maximum data transmission cost 202, data usage per preferred network 203 and a transmission time slot 204.

The mobile terminal user may set the transmission reservation options by selecting one of different transmission completion times 205 including immediate or real-time transmission, 1-hour window transmission, 3-hour window transmission, 6-hour window transmission and other user's inputs, provided by the server/administrator.

The server/administrator may also set the transmission reservation options based on user requirements for various elements such as the transmission completion time, the maximum data transmission cost, data usage per preferred network and the transmission time slot, in consideration of network traffic.

At Step S102, a microcontrol unit (not shown), which is a control device included in the server or the mobile terminal, periodically collects information on accessible networks and network-specific data transmission rate after the transmission reservation options are set and until the content transmission is completed. The accessible networks refer to communication networks including a cellular network and a Wi-Fi network that the mobile terminal can access at its current location, and the network-specific data transmission rate refers to a theoretical data transmission rate of an accessed network or the average transmission rate of data to and from the mobile terminal.

The mobile terminal may store history information in itself or transmit the history information to the server. The history information refers to information on the history of access to communication networks while the mobile terminal is moving and of data communications therewith. It includes location information and data transmission rate information of each accessible network according to a travel route or a place of stay of the mobile terminal for each time slot. The history information is preferably processed and compressed before being stored in consideration of the memory capacity of the mobile terminal. The history information may be used to determine the information collection period at Step S102 and may also be used for scheduling at Step S104 which will be described below.

At Step S104, with a view to meeting the transmission reservation options input by the mobile terminal user or the server/administrator, it is determined whether to transmit data over a currently accessible network or to wait for a subsequent connection with a predictably accessible network before actually transmitting data, based on the information on accessible networks and network-specific data transmission rate collected at Step S102.

In addition, the server may detect a travel time and a travel pattern of the mobile terminal from the history information of the mobile terminal and predict accessible networks and data transmission rate according to a travel time and a travel route of the mobile terminal. The prediction result is used for scheduling. Here, the travel time refers to characteristics of travel along a specific route at the same time slot (e.g. travel along the same route at commuting time), and the travel pattern refers to a pattern of travel via a specific route when the mobile terminal user enters a specific location (e.g. a travel pattern when the mobile terminal user travels by transportation means moving along a scheduled route, such as an expressway, a subway, a bus, etc.). Accuracy of prediction on the accessible networks and the data transmission rate can be improved by using the history information of other mobile terminals transmitted from the server.

Figure 3:
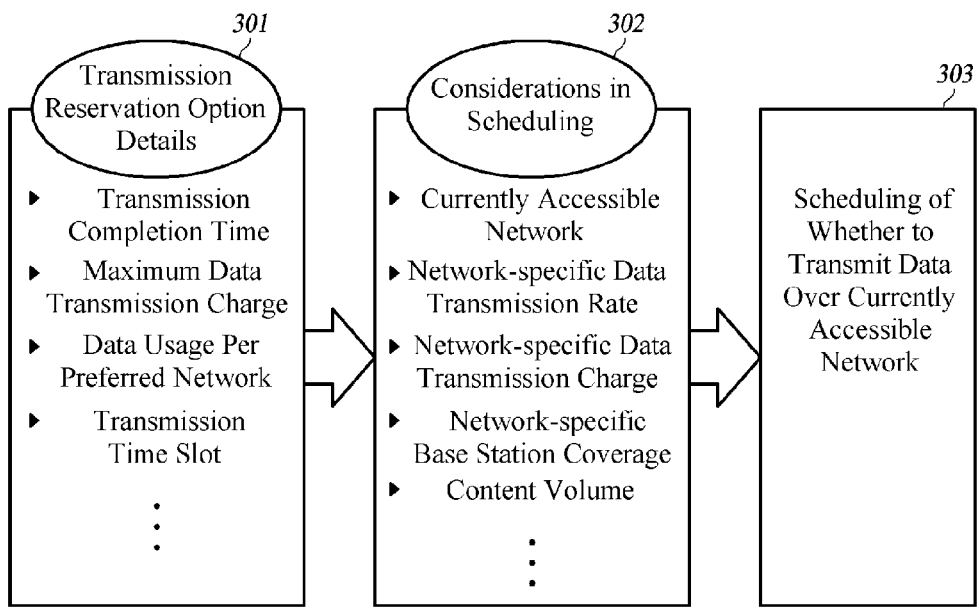
FIG. 3 is a diagram of an example of considerations in scheduling of whether to transmit data over a currently connected network according to at least one embodiment.

Reference is made to FIG. 3 illustrating an example of considerations in scheduling of whether to transmit data over a currently accessed network according to at least one embodiment of the present disclosure. As illustrated in FIG. 3, scheduling is determined based on considerations 302 such as network-specific data transmission cost, network-specific coverage, transmission energy, content volume, etc. so as to meet transmission reservation option details 301 according to the transmission reservation options input at Step S101.

For example, for the purpose of minimizing the data transmission cost, if a fee-based cellular network and a free Wi-Fi network are both available for transmitting data within a transmission completion time, data transmission over the Wi-Fi network is first scheduled regardless of the data transmission rate. The cellular network will be used as auxiliary only when it is predicted that the Wi-Fi network alone cannot transmit all the intended data within the transmission completion time.

As another example, if it is desired to minimize the transmission energy under the assumption that power transmission per hour in the cellular network is the same as that in the Wi-Fi network, data transmission is first scheduled for a network and time with a higher data transmission rate.

As yet another example, for the sake of minimized transmission completion time, data transmission may be continuously attempted starting from when a data transmission request occurs by preferably using a network having a higher data transmission rate over other multiple networks if available.

Further, if the above three purposes (transmission cost, transmission energy and transmission completion time) for scheduling are combined, scheduling may be considered for minimizing (transmission cost)+(transmission completion time)*(arbitrary constant)+(transmission energy)*(arbitrary constant). This may be expressed as:

$$\min_{\pi \in \Pi} f(p(\pi), e(\pi), u(\pi)) \qquad \text{Equation 1}$$

where $\pi$ is an arbitrary scheduling vector, $\Pi$ is a set of scheduling vectors configured to transmit requested content according to setting of a reservation transmission option, $p(\pi)$ is a transmission cost of the scheduling vector $\pi$, $e(\pi)$ is transmission energy of the scheduling vector $\pi$, $u(\pi)$ is a transmission completion time of the scheduling vector $\pi$ and $f(p(\pi),e(\pi),u(\pi))$ is an objective (utility) function for the transmission cost, the transmission energy and the transmission completion time.

Figure 4:
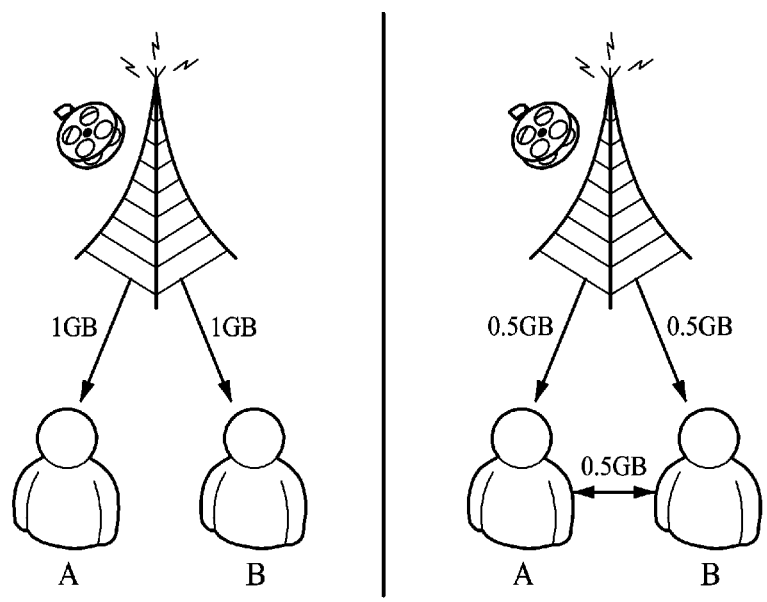
FIG. 4 is a diagram of an example of utilizing a data transmission opportunity between mobile terminals according to at least one embodiment.

FIG. 4 is a diagram illustrating an example of utilizing a data transmission opportunity between mobile terminals according to at least one embodiment of the present disclosure.

As illustrated in FIG. 4, a method for transmitting non-real-time content in a heterogeneous network environment according to another embodiment of the present disclosure may include a process for transmitting content to an accessible mobile terminal over Bluetooth, Wi-Fi direct, etc. in addition to an accessible wireless network.

For example, in a situation that data can be exchanged between mobile terminals using Bluetooth or Wi-Fi direct, and a first mobile terminal wants to download a content, all or some of which are possessed by a second mobile terminal, the first terminal may receive the content from the second terminal through Bluetooth or Wi-Fi direct, thereby further reducing the usage of a communication network for content transfer. For an upload situation, a first mobile terminal may also request that a second mobile terminal upload data on its behalf, thereby further reducing its own usage frequency of communication networks for content transfer.

In the meantime, even when a first mobile terminal wants to download a content, none of which is possessed by a second mobile terminal, and provided that the second terminal can more efficiently use a wireless network (e.g., when the second terminal is expected to access a Wi-Fi network soon), the first terminal may transmit data to upload to the second terminal over Bluetooth, Wi-Fi direct, etc. and request that the second terminal upload the data on its behalf, thereby reducing the frequency of usage of communication networks by the first terminal for content transfer. For download transmission as well, the first terminal may request that the second terminal download data and transmit the downloaded data over Bluetooth, Wi-Fi direct, etc., further reducing the usage frequency of communication networks for content transmission.

At this time, the second mobile terminal may also use the method for transmitting non-real-time content in a heterogeneous network environment according to one or more embodiments of the present disclosure, in uploading or downloading the requested data.

Referring back to FIG. 1, at Step S106, data is transmitted according to t scheduling determined at Step S104.

At Step S107, it is determined whether data transmission has been completed or not. If affirmative, the entire process ends. If negative, the procedure returns to Step S102 to repeat data transmission according to the scheduling by using newly collected information on accessible networks and data transmission rate.

In some embodiments, the history information of a first mobile terminal may be used. The history information of the first mobile terminal may be one stored in its own storage or one received from the server. In addition, the history information of a second mobile terminal may be received from the server and may be used together with the history information of the first mobile terminal.

Although steps of FIG. 1 have been described as being sequentially performed, this is only an exemplary description of the technical idea of at least one embodiment of the present disclosure. Those skilled in the art will appreciate that various modifications, additions and substitutions are possible without departing from the scope of at least one embodiment of the disclosure. For example, the steps shown in FIG. 1 may be rearranged, or one or more steps may be performed in parallel. Therefore, the present disclosure is not limited to time-series order as shown in FIG. 1.

A method for transmitting non-real-time content in a heterogeneous network environment according to another embodiment of the present disclosure introduces the concept of a maximum transmission delay of residual data of content to be transmitted when a transmission reservation operation is set to a transmission completion time, in order to guarantee that content transmission will have been completed within the set transmission completion time.

Figure 5:
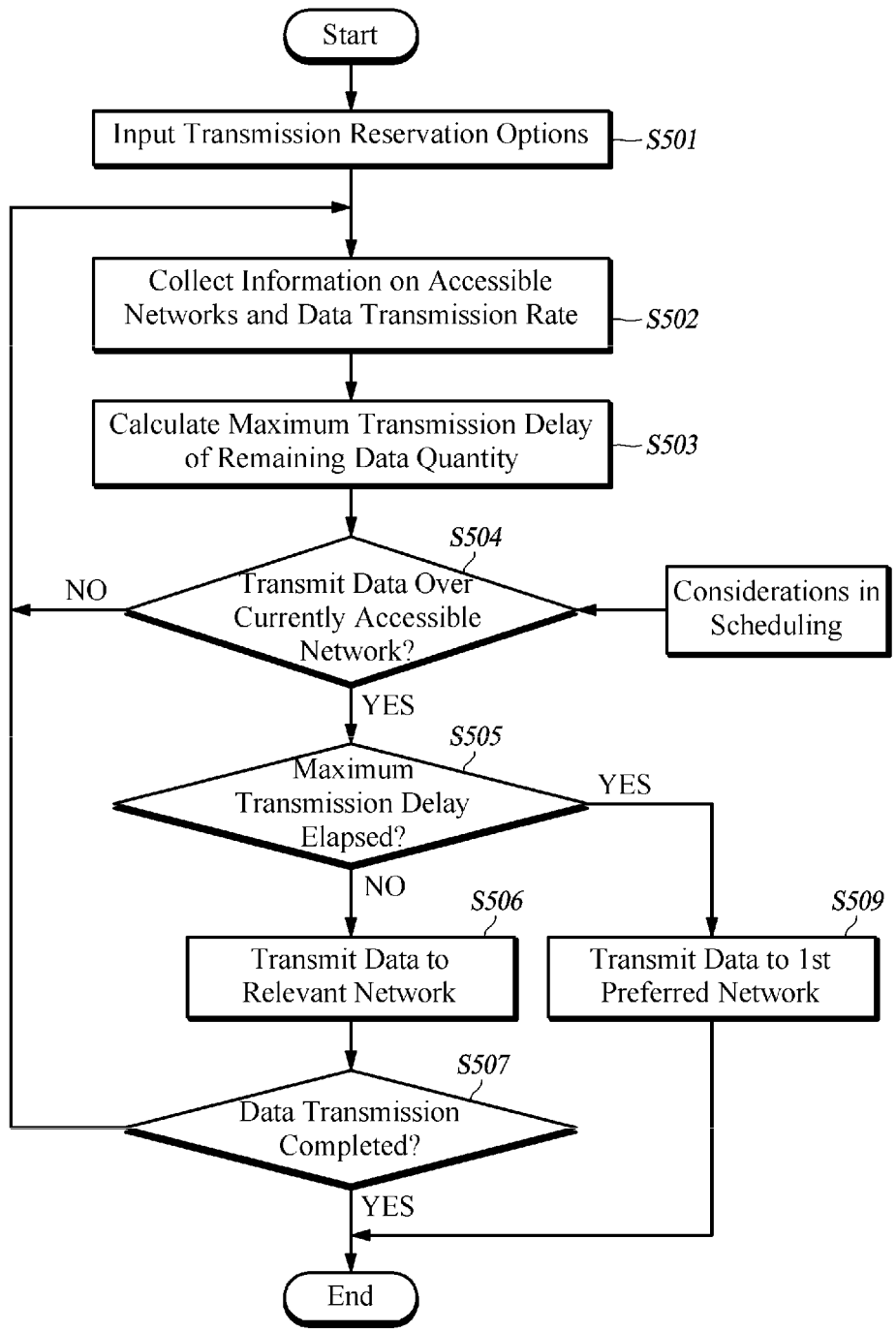
FIG. 5 is a flowchart of a method for reserved transmission of non-real-time content in a heterogeneous network environment with a transmission reservation option of transmission completion time according to at least one embodiment.

This is illustrated in FIG. 5. FIG. 5 is a flowchart of a method for performing reserved transmission of non-real-time content in a heterogeneous network environment when a transmission completion time is selected as a transmission reservation option according to at least one embodiment of the present disclosure. The method of FIG. 5 includes receiving transmission reservation options (S501), collecting information on accessible networks and data transmission rate (S502), calculating a maximum transmission delay of residual data quantity (S503), determining whether to transmit data over a currently accessible network (S504), determining whether the maximum transmission delay has elapsed (S505), transmitting data to a relevant network (S506) determining whether data transmission has been completed (S507) and transmitting data to a first preferred network (S509). Since Steps S501, S502, S504, S506, S507 correspond to Steps S101, S102, S104, S106 and S107, respectively, and the same algorithm is applied, a detailed description thereof is omitted.

In FIG. 5, the mobile terminal transmits data while scheduling whether to transmit data to a currently accessible network based on an input transmission reservation option. When a maximum transmission delay has elapsed, the mobile terminal stops the scheduling based on the transmission reservation option and transmits the remaining data to a first preferred network.

Step S503 calculates the maximum transmission delay of the remaining data quantity to be transmitted. The maximum transmission delay is calculated by taking into account the set transmission completion time within which the remaining data can be transmitted over the first preferred network. Equation 2 shows an exemplary calculation of the maximum transmission delay.

$$T_{rest} = T_{des} - \frac{Q_{rest}}{V_{trs}} \times C_{err} \qquad \text{Equation 2}$$

where $T_{rest}$ is a maximum transmission delay, $T_{des}$ is a transmission completion time set by a mobile terminal user, $V_{trs}$ is an expected data transmission rate of a first preferred network, $Q_{rest}$ is remaining data quantity to be transmitted and $C_{err}$ is an error constant (equal to or greater than 1) considering an error of the expected data transmission rate.

The first preferred network is a network to which the mobile terminal has access when the maximum transmission delay has elapsed. Alternatively, the first preferred network may be a network having the highest data transmission rate among accessible networks when the maximum transmission delay has elapsed. The first preferred network may also be a cellular network having the highest access success rate due to its wide coverage of a base station.

At Step S502, it is determined whether the maximum transmission delay calculated at Step S501 has elapsed or not. If negative, the process goes to step S507 for transmitting data to a relevant network according to scheduling determination of Step S505. If affirmative, the process undergoes Step S503 for transmitting data to the first preferred network irrespective of scheduling of Step S505.

Although steps of FIG. 5 have been described as being sequentially performed, this is only an exemplary description of the technical idea of at least one embodiment of the present disclosure. Those skilled in the art will appreciate that various modifications, additions and substitutions are possible, without departing from the characteristics of at least one embodiment of the disclosure. For example, the steps shown in FIG. 5 may be rearranged, or one or more steps may be performed in parallel. Therefore, the present disclosure is not limited to time-series order as shown in FIG. 5.

Figure 6:
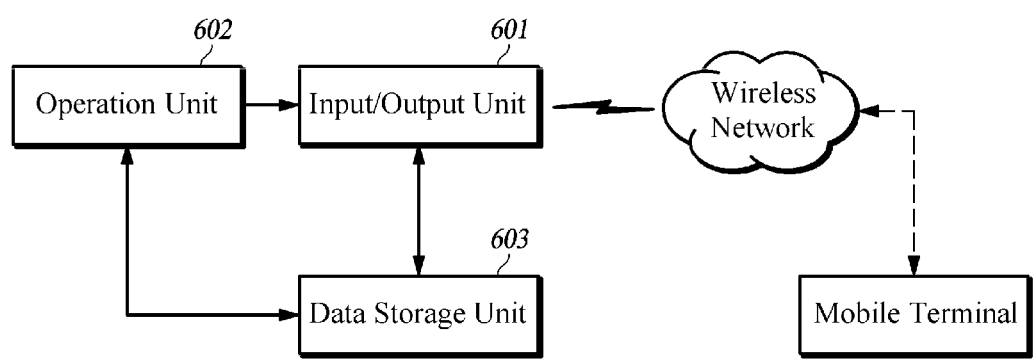
FIG. 6 is a diagram of configuration of a server for reserved transmission of content in a heterogeneous network environment according to at least one embodiment.

FIG. 6 depicts a configuration of a server for performing reserved transmission of content in a heterogeneous network environment according to at least one embodiment of the present disclosure. The server includes an input/output unit 601, a operation unit 602 and a content storage unit 603.

The input/output unit 601 receives transmission reservation options from a mobile terminal or a server. The transmission reservation options may be set with respect to various elements such as a transmission completion time, a maximum data transmission cost, data usage per preferred network and a transmission time slot.

The transmission reservation options may be set by a mobile terminal user by selecting one of plural transmission completion times including immediate or real-time transmission, 1-hour window transmission, 3-hour window transmission, 6-hour window transmission, etc., provided by the server.

The transmission reservation options may be set by the server/administrator according to user requirements for various elements such as the transmission completion time, the maximum data transmission cost, the data usage per preferred network and the transmission time slot in consideration of network traffic.

The input/output unit 601 periodically receives information on accessible networks and network-specific data transmission rate from the mobile terminal once the reservation transmission options are set.

The input/output unit 601 also receives history information of the mobile terminal about location information and data transmission rate information of accessible networks according to a travel route or a stay place of the mobile terminal from the mobile terminal.

The operation unit 602 performs scheduling as to whether the mobile terminal needs to transmit data over a currently accessible network or wait for a to-be-accessed network that is expected to be connected to and then transmit data, based on the information on the accessible networks and the network-specific data transmission rate received by the input/output unit 601 so as to fulfill the transmission reservation options input by the mobile terminal user or the server.

The operation unit 602 detects a travel time and a travel pattern of the mobile terminal from the history information of the mobile terminal and predicts accessible networks and data transmission rate according to a travel time and a travel route of the mobile terminal. Here, the travel time refers to characteristics of travel along a specific route at the same time slot (e.g. travel along the same route at rush hour) and the travel pattern refers to a pattern of travel via a specific route when the mobile terminal user enters a specific location (e.g. a travel pattern when the mobile terminal user travels by transportation means moving along a scheduled route, such as an expressway, a subway, a bus, etc.). Accuracy of prediction on the accessible networks and the data transmission rate can be improved by using the history information of other mobile terminals received by the input/output unit 601.

The operation unit 602 may perform scheduling as to whether the mobile terminal needs to transmit data over a currently accessible network or wait for an access-expected network to be connected and then transmit data, based on the predicted information and the information on accessible networks and network-specific data transmission rate received by the input/output unit 601.

The operation unit 602 performs scheduling based on network-specific data transmission cost, network-specific coverage, transmission energy, content volume, etc. so that the transmission reservation options input by the input/output unit 601 may be satisfied.

For example, where the scheduling aims at minimizing a data transmission cost and where both the fee-based cellular network and the free Wi-Fi network are available for transmitting data within a transmission completion time, data transmission over the Wi-Fi network is scheduled with priority regardless of data transmission rate. The cellular network is used as an auxiliary only when it is predicted that the Wi-Fi network alone cannot serve all the intended data within the transmission completion time.

As another example, where it is desired to minimize transmission energy under the assumption that power transmission per hour is equal for the cellular network and the Wi-Fi network, data transmission over a network with high data transmission rate is scheduled with priority.

As a further example, where minimization of the transmission completion time is critical, data transmission may be continuously attempted starting from a time when a data transmission request occurs by using a network having a high data transmission rate under a situation in which data transmission can be performed over multiple networks.

Further, if the above three purposes (transmission cost, transmission energy and transmission completion time) for scheduling are combined, scheduling may be considered for minimizing (transmission cost)+(transmission completion time)*(arbitrary constant)+(transmission energy)*(arbitrary constant). This is expressed as Equation 1.

The operation unit 602 continuously performs scheduling of whether to transmit data over an accessible network until data transmission is completed. In this case, information on accessible networks and data transmission rate, periodically received from the mobile terminal, is used. In another embodiment, history information of the mobile terminal received from the mobile terminal may be used and history information of other mobile terminals received from other mobile terminals may also be used.

The content storage unit 603 receives data from the input/output unit 601 and stores the data or transmits stored data to the input/output unit 601.

Figure 7:
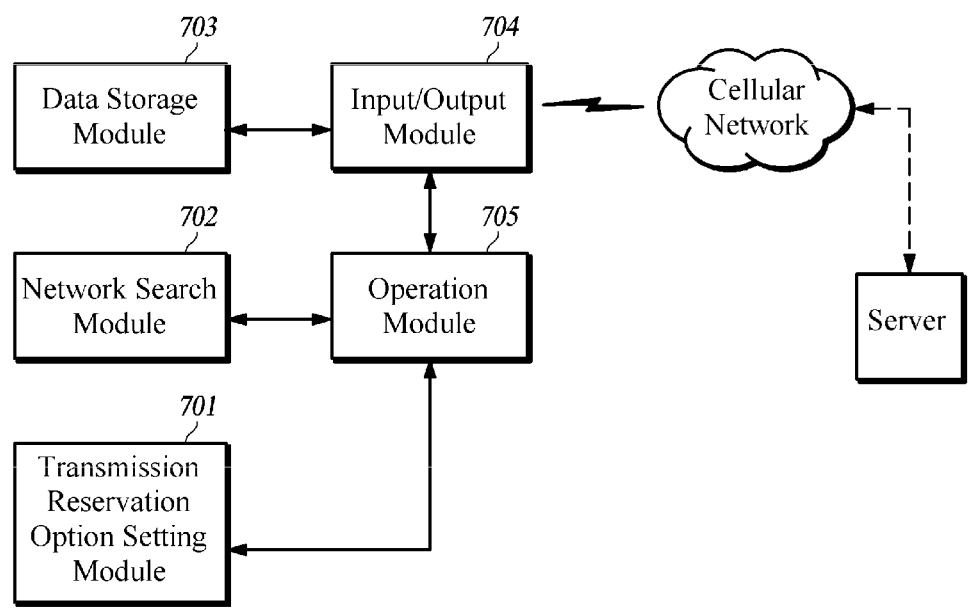
FIG. 7 is a diagram of a configuration of a mobile terminal for reserved transmission of content in a heterogeneous network environment according to at least one embodiment.

FIG. 7 is a diagram of a configuration of a mobile terminal for a reserved transmission of content in a heterogeneous network environment according to at least one embodiment of the present disclosure. The mobile terminal includes a transmission reservation option setting module 701, a network search module 702, a data storage module 703, an input/output module 704 and an operation module 705.

The transmission reservation option setting module 701 receives transmission reservation options from a mobile terminal user. Alternatively, the transmission reservation option setting module 701 may receive the transmission reservation options from a server. The transmission reservation options may be set with respect to various elements such as a transmission completion time, a maximum data transmission cost, data usage per preferred network and a transmission time slot.

The transmission reservation options may be set by the mobile terminal user by selecting one of plural transmission completion times including immediate or real-time transmission, 1-hour window transmission, 3-hour window transmission, 6-hour window transmission, etc., provided by the server.

The transmission reservation options may be set by the server according to user requirements for various elements such as the transmission completion time, the maximum data transmission cost, the data usage per preferred network and the transmission time slot in consideration of network traffic.

The network search module 702 periodically collects information on networks accessible by the mobile terminal and network-specific data transmission rate after the reservation transmission options are set.

The operation module 705 performs scheduling as to whether the mobile terminal needs to transmit data over a currently accessible network or wait for an access-expected network to be connected and then transmit data, based on the information on accessible networks and network-specific data transmission rate received by the network search module 702 so as to satisfy the transmission reservation options received by the transmission reservation option setting module 701.

The operation module 705 may use, for scheduling, history information of the mobile terminal about location information and data transmission rate information of accessible networks according to a travel route or a stay place of the mobile terminal on a time slot basis. The history information of the mobile terminal is stored in a data storage device of the mobile terminal. Alternatively, the history information of the mobile terminal may be received from the server.

The operation module 705 detects travel time and a travel pattern of the mobile terminal from the history information of the mobile terminal and predicts accessible networks and data transmission rate according to a travel time and a travel route of the mobile terminal. Here, the travel time refers to characteristics of travel along a specific route at the same time slot (e.g. travel along the same route at rush hour) and the travel pattern refers to a pattern of travel via a specific route when the mobile terminal user enters a specific location (e.g. a travel pattern when the mobile terminal user travels using transportation means moving along a scheduled route, such as an expressway, a subway, a bus, etc.).

The operation module 705 may perform scheduling as to whether the mobile terminal needs to transmit data over a currently accessible network or wait for an access-expected network to be connected and then transmit data, based on the predicted information and the information on accessible networks and network-specific data transmission rate collected by the network search module 702.

In performing scheduling as to whether to transmit data over a currently accessible network, the operation module 705 performs scheduling based on network-specific data transmission cost, network-specific coverage, transmission energy, content volume, etc. so that the set transmission reservation options may be satisfied.

For example, where the scheduling is determined for the purpose of minimizing a data transmission cost and where both the fee-based cellular network and the free Wi-Fi network are present as networks capable of transmitting data within a transmission completion time, data transmission over the Wi-Fi network is scheduled with priority regardless of data transmission rate. The cellular network is used as an auxiliary only when it is predicted that the Wi-Fi network alone cannot serve all the intended data within the transmission completion time.

As another example, where it is desired to minimize transmission energy under the assumption that power transmission per hour is equal for the cellular network and the Wi-Fi network, data transmission over a network with high data transmission rate is scheduled with priority.

As a further example, where minimization of the transmission completion time is critical, data transmission may be continuously attempted starting from a time when a data transmission request occurs by using a network having a high data transmission rate under a situation in which data transmission can be performed over multiple networks.

Further, if the above three purposes (transmission cost, transmission energy and transmission completion time) for scheduling are mixed, scheduling for minimizing (transmission cost)+(transmission completion time)*(arbitrary constant)+(transmission energy)*(arbitrary constant) may be considered. This is expressed as Equation 1.

The operation module 705 continuously performs scheduling of whether to transmit data over an accessible network until data transmission is completed. In this case, information on accessible networks and data transmission rate, periodically collected by the network search module 702, is used. In another embodiment, history information of the mobile terminal received from the mobile terminal may be used and history information of other mobile terminals received from the server may also be used.

The data storage module 703 stores content data to be uploaded or downloaded.

The input/output module 704 transmits data according to scheduling determination of the operation module 705. In some embodiments, the input/output module 704 may receive the transmission reservation options from the server or receive the history information of other mobile terminals.

The data storage module 703 receives data from the input/output module 704 and stores the data or transmits the stored data to the input/output module 704.

Although exemplary embodiments of the present disclosure have been described for illustrative purposes, those skilled in the art will appreciate that the method for reserved transmission of non-real-time contents in a heterogeneous network environment can be implemented through various modifications, additions and substitutions possible, without departing from the essential characteristics of the disclosure.

| REFERENCE NUMERALS |  |
|---|---|
| 601: Input/output unit Terminal | 602: Operation Unit |
| 603: Data Storage Unit | |
| 701: Transmission Reservation Option Setting Module | |
| 702: Network Search Module | 703: Data Storage Module |
| 704: Input/output Module | 705: Operation Module |

CROSS-REFERENCE TO RELATED APPLICATION

If applicable, this application claims priority under 35 U.S.C §119(a) of Patent Application No. 10-2012-0029619, filed on Mar. 23, 2012 in Korea, the entire content of which is incorporated herein by reference. In addition, this non-provisional application claims priority in countries, other than the U.S., with the same reason based on the Korean patent application, the entire content of which is hereby incorporated by reference.

The invention claimed is:

1. A method for performing reserved transmission of non-real-time content in a heterogeneous network environment involving multiple heterogeneous communication networks serving data communications to a mobile terminal, the method comprising:
   receiving a transmission reservation option from either a mobile terminal user or a server;
   collecting information on networks accessible by the mobile terminal and data transmission rate on a regular basis;
   performing a scheduling of whether to transmit data over a currently accessible network, based on the received transmission reservation option and the collected information on the accessible networks and the data transmission rate; and
   repeating data transmission according to the scheduling until transmission of the content is completed,
   wherein the performing the scheduling comprises performing a scheduling for minimizing a prescribed function value having at least one of transmission energy, a transmission charge and a transmission completion time as a parameter.

2. A method for performed by a mobile terminal for reserved transmission of non-real-time content in a heterogeneous network environment involving multiple heterogeneous networks serving data communications to the mobile terminal, the method comprising:
   receiving a transmission reservation option from either the mobile terminal user or a server;
   collecting information on networks accessible by the mobile terminal and data transmission rate on a regular basis;

estimating information on the accessible networks and the data transmission rate according to a travel route of the mobile terminal from history information of the mobile terminal;

performing scheduling of whether to transmit data over a currently accessible network, based on the received transmission reservation option, the collected information on the accessible networks and the data transmission rate and the estimated information on the accessible networks and the data transmission rate; and repeating data transmission according to the scheduling until transmission of the content is completed.

3. The method of claim 2, further comprising, subsequent to the collecting of the information, processing or compressing, and storing the information on the accessible networks and the data transmission rate according to the travel route of the mobile terminal.

4. The method of claim 2, wherein the performing of the scheduling comprises performing scheduling for minimizing a prescribed function value having at least one of transmission energy, a transmission cost and a transmission completion time as a parameter.

5. The method of claim 4, wherein the prescribed function value is expressed by $$\min_{\pi \in \Pi} f(p(\pi), e(\pi), u(\pi))$$

where $\pi$ is an arbitrary scheduling vector, $\Pi$ is a set of scheduling vectors configured to transmit requested content according to setting of the reservation transmission option, $p(\pi)$ is a transmission cost of the scheduling vector $\pi$, $e(\pi)$ is transmission energy of the scheduling vector $\pi$, $u(\pi)$ is a transmission completion time of the scheduling vector $\pi$ and $f(p(\pi),e(\pi),u(\pi))$ is an objective (utility) function for the transmission cost, the transmission energy and the transmission completion time.

6. The method of claim 1 or 2, wherein the transmission reservation option includes at least one of a transmission completion time, a data transmission cost, data usage per preferred network and a transmission time slot.

7. The method of claim 1 or 2, wherein the transmission reservation option is one transmission completion time selected by the mobile terminal user from among a plurality of transmission completion times provided by the server.

8. The method of claim 7, further comprising, subsequent to the receiving of the transmission reservation option:
calculating a maximum transmission delay of quantity of remaining data for transmission, based on the received transmission reservation option;
determining whether transmission of all the content has been completed when the maximum transmission delay has elapsed; and
transmitting the remaining data to a first preferred network from the mobile terminal when transmission of all the content has not been completed.

9. The method of claim 8, wherein the first preferred network is a network having a highest data transmission rate and a network having a widest base station coverage among networks accessible by the mobile terminal when the maximum transmission time has elapsed.

10. The method of claim 8, wherein the first preferred network is a cellular network.

11. A data server for performing reserved transmission of non-real-time content in a heterogeneous network environment involving multiple heterogeneous communication networks serving data communications to a mobile terminal, the data server comprising:
an input/output unit configured to receive a transmission reservation option from either a mobile terminal user or a server, receive information on accessible networks and data transmission rate on a regular basis from the mobile terminal and transmit the content;
at least one processor to implement an operation unit configured to perform a scheduling of whether to transmit data over a currently accessible network, based on the received transmission reservation option and the received information on the accessible networks and the data transmission rate; and
a data storage unit configured to receive data from the input/output unit and store the data, or transmit the stored data to the input/output unit,
wherein the operation unit performs the scheduling to minimize a prescribed function value having at least one of transmission energy, a transmission charge and a transmission completion time as a parameter.

12. A data server for performing reserved transmission of non-real-time content in a heterogeneous network environment involving multiple heterogeneous communication networks serving data communications to a mobile terminal, the data server comprising:
an input/output unit configured to receive a transmission reservation option from either a mobile terminal user or a server, receive history information of the mobile terminal and information on accessible networks and data transmission rate on a regular basis from the mobile terminal and transmit the content;
at least one processor to implement an operation unit configured to perform a scheduling of whether to transmit data over a currently accessible network, based on the received transmission reservation option, the received history information of the mobile terminal and the received information on the accessible networks and the data transmission rate; and
a data storage unit configured to receive data from the input/output unit and store the data, or transmit the stored data to the input/output unit.

13. The data server of claim 11 or 12, wherein the transmission reservation option includes at least one of a data transmission cost, data usage per preferred network and a transmission time slot.

14. The data server of claim 11 or 12, wherein the transmission reservation option is one transmission completion time selected by the mobile terminal user from among a plurality of transmission completion times provided by the server.

15. The data server of claim 12, wherein the operation unit performs the scheduling to minimize a prescribed function value having at least one of transmission energy, a transmission cost and a transmission completion time as a parameter.

16. The data server of claim 15, wherein the prescribed function value is expressed by $$\min_{\pi \in \Pi} f(p(\pi), e(\pi), u(\pi))$$

where $\pi$ is an arbitrary scheduling vector, $\Pi$ is a set of scheduling vectors configured to transmit requested content according to setting of the reservation transmission option, p(π) is a transmission cost of the scheduling vector π, e(π) is transmission energy of the scheduling vector π, u(π) is a transmission completion time of the scheduling vector π and f(p(π),e(π),u(π)) is an objective (utility) function for the transmission cost, the transmission energy and the transmission completion time.

17. A mobile terminal for performing reserved transmission of non-real-time content in a heterogeneous network environment involving multiple heterogeneous networks serving data communications to the mobile terminal, the mobile terminal comprising:
at least one processor to implement:
a transmission reservation option setting module configured to receive a transmission reservation option from either a mobile terminal user or a server;
a network search module configured to collect information on networks accessible by the mobile terminal and data transmission rate on a regular basis; and
an operation module configured to repeat scheduling of whether to transmit data over a currently accessible network until transmission of the content is completed, based on the transmission reservation option received by the transmission reservation option setting module and the information on the accessible networks and the data transmission rate collected by the network search module;
an input/output module configured to transmit data according to the scheduling of the operation module; and
a data storage module configured to receive data from the input/output module and store the data, or transmit the stored data to the input/output module,
wherein the operation module performs the scheduling to minimize a prescribed function value having at least one of transmission energy, a transmission charge and a transmission completion time as a parameter.

18. A mobile terminal for performing reserved transmission of non-real-time content in a heterogeneous network environment involving multiple heterogeneous networks serving data communications to the mobile terminal, the mobile terminal comprising:
at least one processor to implement:
a transmission reservation option setting module configured to receive a transmission reservation option from either a mobile terminal user or a server;
a network search module configured to collect information on accessible networks and data transmission rate according to a travel route of the mobile terminal on a regular basis; and
an operation module configured to repeat scheduling of whether to transmit data over a currently accessible network until transmission of the content is completed, based on the transmission reservation option received by the transmission reservation option setting module, the information on the accessible networks and the data transmission rate collected by the network search module and history information of the mobile terminal;
an input/output module configured to transmit data according to the scheduling of the operation module; and
a data storage module configured to receive data from the input/output module and store the data, or transmit the stored data to the input/output module.

19. The mobile terminal of claim 17 or 18, wherein the transmission reservation options include at least one of a data transmission cost, data usage per preferred network and a transmission time slot.

20. The mobile terminal of claim 17 or 18, wherein the transmission reservation option is a transmission completion time selected by the mobile terminal user from among a plurality of transmission completion times provided by the server.

21. The mobile terminal of claim 18, wherein the operation unit performs the scheduling to minimize a prescribed function value having at least one of transmission energy, a transmission cost and a transmission completion time as a parameter.

22. The mobile terminal of claim 21, wherein the prescribed function value is expressed by $$\min_{\pi \in \Pi} f(p(\pi), e(\pi), u(\pi))$$

where π is an arbitrary scheduling vector, Π is a set of scheduling vectors configured to transmit requested content according to setting of the reservation transmission option, p(π) is a transmission cost of the scheduling vector π, e(π) is transmission energy of the scheduling vector π, u(π) is a transmission completion time of the scheduling vector π and f(p(π),e(π),u(π)) is an objective (utility) function for the transmission cost, the transmission energy and the transmission completion time.

23. A non-transitory computer readable medium storing a computer program including computer-executable instructions for causing, when executed in a processor, the processor to perform reserved transmission of non-real-time content in a heterogeneous network environment involving multiple heterogeneous networks serving data communications to a mobile terminal, comprising:
receiving a transmission reservation option from either a mobile terminal user or a server;
collecting information on networks accessible by the mobile terminal and data transmission rate on a regular basis;
performing scheduling of whether to transmit data over a currently accessible network, based on the received transmission reservation option and the collected information on the accessible networks and the data transmission rate; and
repeating data transmission according to the scheduling until transmission of the content is completed,
wherein the performing the scheduling comprises performing a scheduling for minimizing a prescribed function value having at least one of transmission energy, a transmission charge and a transmission completion time as a parameter.

24. A non-transitory computer readable medium storing a computer program including computer-executable instructions for causing, when executed in a processor, the processor to perform reserved transmission of non-real-time content in a heterogeneous network environment involving multiple heterogeneous networks serving data communications to a mobile terminal, comprising:
collecting information on networks accessible by the mobile terminal and data transmission rate at on a regular basis;

estimating information on accessible networks and data transmission rate according to a travel route of the mobile terminal from history information of the mobile terminal;
performing scheduling of whether to transmit data over a currently accessible network, based on the received transmission reservation option, the collected information on the accessible networks and the data transmission rate and the estimation information on the accessible networks and the data transmission rate; and
repeating data transmission according to the scheduling until transmission of the content is completed.

\* \* \* \* \*